United States Patent
Kondo et al.

(10) Patent No.: US 7,780,359 B2
(45) Date of Patent: Aug. 24, 2010

(54) CONNECTION STRUCTURE OF PHOTOELECTRIC FLEXIBLE WIRING BOARD, CONNECTOR AND PHOTOELECTRIC FLEXIBLE WIRING BOARD

(75) Inventors: Hayato Kondo, Yao (JP); Takayuki Nagata, Yao (JP)

(73) Assignee: Hosiden Corporation, Yao-shi (JP)

( * ) Notice: Subject to any disclaimer, the term of this patent is extended or adjusted under 35 U.S.C. 154(b) by 0 days.

(21) Appl. No.: 12/162,870

(22) PCT Filed: Jan. 29, 2007

(86) PCT No.: PCT/JP2007/051369

§ 371 (c)(1),
(2), (4) Date: Jul. 31, 2008

(87) PCT Pub. No.: WO2007/088805

PCT Pub. Date: Aug. 9, 2007

(65) Prior Publication Data

US 2009/0041408 A1   Feb. 12, 2009

(30) Foreign Application Priority Data

Feb. 3, 2006 (JP) .............................. 2006-027689
Jun. 14, 2006 (JP) .............................. 2006-165020

(51) Int. Cl.
*G02B 6/36* (2006.01)

(52) U.S. Cl. ............................ 385/88; 385/14; 385/89; 385/101; 385/129; 385/130

(58) Field of Classification Search .................. 385/101
See application file for complete search history.

(56) References Cited

U.S. PATENT DOCUMENTS

| 7,458,732 B2 * | 12/2008 | Harano et al. ................. 385/92 |
| 2003/0039455 A1 | 2/2003 | Ouchi |
| 2007/0019914 A1 * | 1/2007 | Ohtsu et al. ................... 385/89 |

FOREIGN PATENT DOCUMENTS

| JP | 2001-43934 | 2/2001 |
| JP | 2003-227951 A1 | 8/2003 |
| JP | 2004-31508 A1 | 1/2004 |
| JP | 2005-300930 A1 | 10/2005 |
| WO | WO 2006/068045 A1 | 6/2006 |

OTHER PUBLICATIONS

International Search Report for International Application No. PCT/JP2007/051369 dated Apr. 20, 2007.

* cited by examiner

*Primary Examiner*—Uyen-Chau N Le
*Assistant Examiner*—Chad H Smith
(74) *Attorney, Agent, or Firm*—Kratz, Quintos & Hanson, LLP (57) ABSTRACT

The present invention provides a longer optical transmission line in an photoelectric flexible wiring board to downsize the photoelectric flexible wiring board and obtaining high flexibility and good optical transmission characteristics.

In an photoelectric flexible wiring board 30, photonic devices 45 and 55 performing photoelectric conversion and drivers 60 and 70 therefor are excluded. The photonic devices 45 and 55 are mounted in connectors 40 and 50 for connecting the photoelectric flexible wiring board 30 to mounting boards 12 and 22. The drivers 60 and 70 are mounted on the mounting boards 12 and 22 together with the connectors 40 and 50.

10 Claims, 6 Drawing Sheets

CONNECTION STRUCTURE OF PHOTOELECTRIC FLEXIBLE WIRING BOARD, CONNECTOR AND PHOTOELECTRIC FLEXIBLE WIRING BOARD

TECHNICAL FIELD

The present invention relates to a connection structure of an photoelectric flexible wiring board transmitting both optical and electrical signals, for connecting the wiring board to another board such as a rigid board. The invention also relates to a connector and an photoelectric flexible wiring board for use in the connection structure of the photoelectric flexible wiring board.

BACKGROUND ART

High-speed performance has been demanded of information processing terminal apparatuses supporting the recent high-speed communication networks. As one approach for meeting the demand, optical-electrical mixed circuit boards have been developed, which transmit both optical and electrical signals with a single board. The feature of the optical-electrical mixed circuit board resides in the parallel arrangement of an optical transmission line relative to a plurality of electrical transmission lines. As one type of such an optical-electrical mixed circuit board, a photoelectric flexible wiring board with high flexibility has been proposed (Patent Documents 1 to 3).

Patent Document 1: Japanese Unexamined Patent Publication No. 2003-227951

Patent Document 2: Japanese Unexamined Patent Publication No. 2004-031508

Patent Document 3: Japanese Unexamined Patent Publication No. 2005-300930

Taking advantage of its high flexibility, a photoelectric flexible wiring board is used in information processing terminal apparatus with a rotating portion to connect an electric circuit on the main body side with an electric circuit on the cover body side. With the main body being rotatably coupled to the cover body doubling as a display by means of a hinge shaft, such information processing terminal apparatuses include cellular phones, PDAs (personal digital assistants), personal computers, and game consoles. In this case, the photoelectric flexible wiring board is connected between a rigid mounting board on the main body side and a rigid mounting board on the cover body side, using a set of connectors. More specifically, opposite end portions of the photoelectric flexible wiring board are inserted into a set of plug-type connectors that are mounted on the mounting boards on the opposite sides, so that the flexible board is connected to the mounting boards on the opposite sides.

Figure 14:
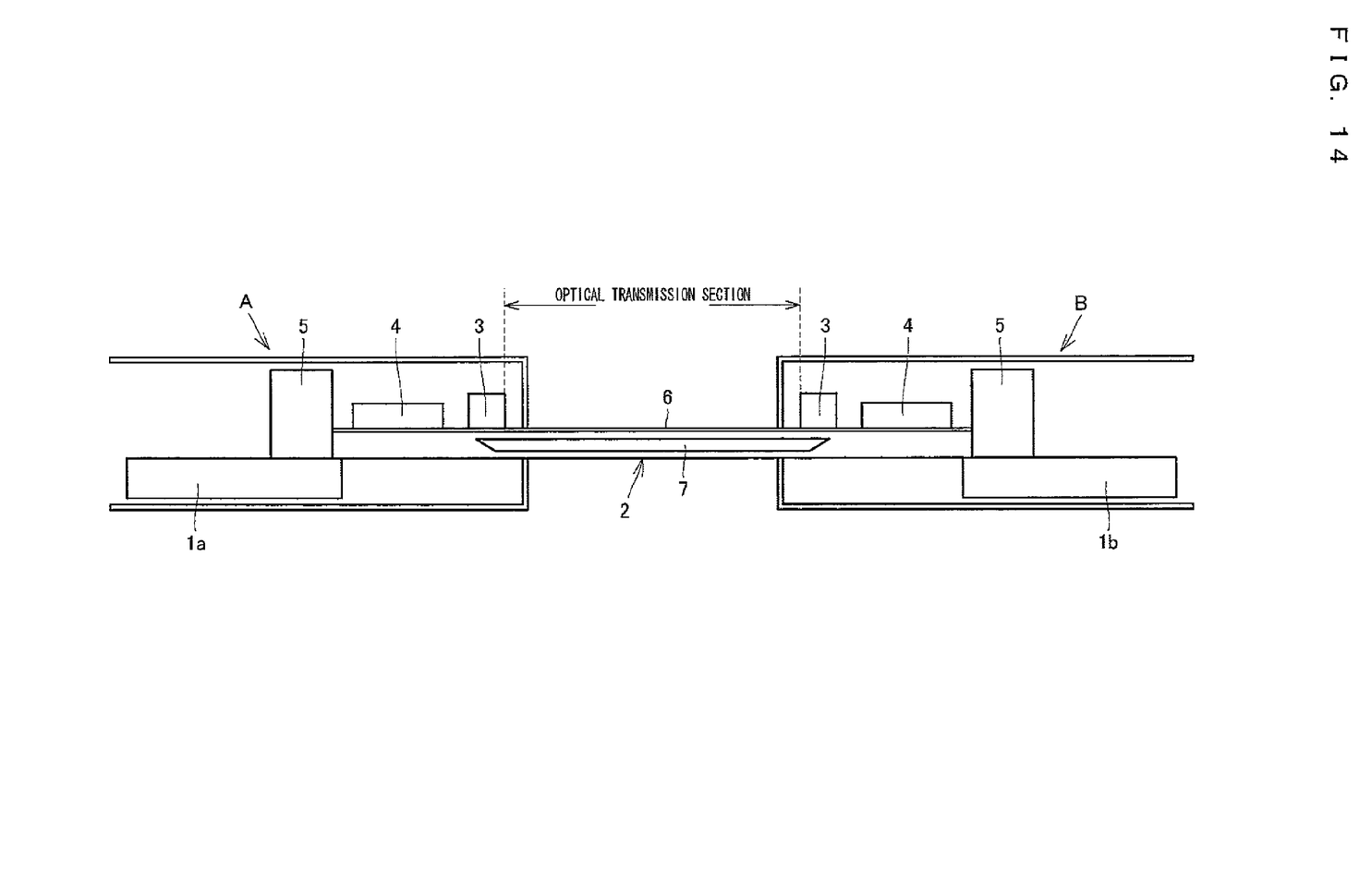
FIG. 14 is a schematic configuration view in the form of a longitudinal cross-sectional side view of a wiring structure of a conventional photoelectric flexible wiring board.

FIG. 14 illustrates a conventional example of a connection structure of an photoelectric flexible wiring board. In the figure, "A" denotes a main body of, e.g., a clamshell cellular phone, and "B" denotes a cover body of the cellular phone. A rigid mounting board 1a in the main body A and a rigid mounting board 1b in the cover body B are connected via an photoelectric flexible wiring board 2. The photoelectric flexible wiring board 2 includes a plurality of electrical transmission lines 6 and an optical transmission line 7 (an optical waveguide), as well as photonic devices 3 for converting optical signals to electrical signals and drivers 4 therefor toward the ends of the wiring board.

Meanwhile, the mounting boards 1a and 1b are mounted with plug-type connectors 5 and 5, into which respective end portions of the photoelectric flexible wiring board 2 are inserted, so that the mounting boards 1a and 1b are connected with each other via the photoelectric flexible wiring board 2. Conductive contacts that are equal in total number to the transmission lines are disposed inside the respective connectors 5 and 5 and on the opposite end portions of the photoelectric flexible wiring board 2.

That is, although the conventional photoelectric flexible wiring board 2 performs optical transmission on the wiring board, taking in and out of signals between the wiring board and the mounting boards has to be performed in the form of electrical signals in order to interface the wiring board with the mounting boards 1a and 1b connected thereto. For this reason, the photoelectric flexible wiring board 2 is provided on its opposite end portions with the photonic devices 3 performing photoelectric conversion and the drivers 4 therefor.

Such a conventional photoelectric flexible wiring board 2 and its connection structure, however, have problems as described below in connection with the mounting of the photonic devices 3 and drivers 4 therefor on the opposite end portions of the wiring board.

That is, compared with the entire length L1 of the photoelectric flexible wiring board 2, the length L2 of the optical transmission section in the photoelectric flexible wiring board 2, i.e., the substantial length of the optical transmission line, is relatively short. Therefore, the photoelectric flexible wiring board 2 has an unnecessarily large size, because of which its application to small apparatuses is difficult. This is the first problem.

In the photoelectric flexible wiring board 2, as the mounting portions on the ends mounted with the photonic devices 3 and drivers 4 therefor are extremely less flexible than the portion used as the optical transmission section, its original flexibility has to be secured between the photonic devices 3, resulting in overall flexibility being not as high as expected from the entire length. For this reason, it is difficult to apply the flexible wiring board 2 to such a use requiring high flexibility as clamshell cellular phones. This is the second problem.

The third problem is increased costs for the photoelectric flexible wiring board 2 due to a process of mounting the photonic devices 3 and drivers 4 therefor in fabrication of the board 2.

The fourth problem is that the substantial length of the optical transmission line is limited in comparison with the entire length L1 of the photoelectric flexible wiring board 2. More particularly, the optical transmission line is not present on the opposite end portions (farther portions from the photonic devices 3) of the photoelectric flexible wiring board 2. Instead, these portions have the electrical transmission lines (copper wire patterns), which transmit high-speed digital signals that should be transmitted optically. Therefore, advantages of optical transmission are not fully utilized. Specifically, these electrical transmission lines disadvantageously cause deterioration in electromagnetic compatibility (EMC) characteristics, degradation in signal transmission characteristics, and the like.

DISCLOSURE OF THE INVENTION

Problems to be Solved by the Invention

In view of the foregoing circumstances, the present invention provides a connection structure of an photoelectric flexible wiring board, a connector for the photoelectric flexible wiring board, and the photoelectric flexible wiring board. The connection structure, the connector and the wiring board are aimed at securing a longest possible length for an optical transmission line in the photoelectric flexible wiring board, thereby allowing for downsizing of the photoelectric flexible wiring board as well as securing high flexibility and good optical transmission characteristics.

Means for Solving the Problems

In order to achieve the above-mentioned object, a connection structure of an photoelectric flexible wiring board according to the present invention is used for connecting the photoelectric flexible wiring board to a board using a connector, the photoelectric flexible wiring board transmitting both optical and electrical signals. The connector includes a guide hole of U-shape in cross section, adapted to receive an end portion of the photoelectric flexible wiring board, a plurality of contacts arranged laterally on a ceiling of the guide hole, and a photonic device provided on the ceiling of the guide hole. The board is mounted with the connector and a driver for the photonic device, the driver being adapted to perform photoelectric conversion. The photoelectric flexible wiring board includes a plurality of electrical transmission lines arranged laterally on a surface thereof so as to be contactable with the respective contacts, the electrical transmission lines having an entire length substantially equal to an entire length of the photoelectric flexible wiring board, an optical transmission line provided within the wiring board and having an entire length substantially equal to the entire length of the photoelectric flexible wiring board, an optical signal entrance-cum-exit provided in a surface of the end portion so as to face the photonic device, and a waveguide mirror disposed in an end portion of the optical transmission line so as to face the optical signal entrance-cum-exit for bending the optical waveguide at a right angle.

In the connection structure of the photoelectric flexible wiring board according to the present invention, the photonic device and the driver therefor, which have conventionally been disposed on an optical transmission line in the photoelectric flexible wiring board, are excluded from the photoelectric flexible wiring board. Consequently, the optical transmission line can be laid from a first end to a second end, i.e., across the substantially entire length, of the wiring board. In other words, the length of the optical transmission line that is useful in high-speed transmission and is highly flexible is not sacrificed for the photonic device and driver, obtaining a longest possible length for the optical transmission line.

The photonic device excluded from the photoelectric flexible wiring board is mounted in the connector, so that the photonic device can perform photoelectric conversion in a similar manner as in the case of being mounted on the photoelectric flexible wiring board, without causing any functional problem. The driver may be mounted in the connector together with the photonic device but, in terms of avoiding increase in complexity of the wiring structure and in size of the connector, and the like, the driver may be mounted on another board on which the connector is mounted.

The position to dispose the photonic device in the connector depends on the wiring pattern of the electrical and optical transmission lines in the photoelectric flexible wiring board. Particularly, if the optical transmission line is disposed in the middle of the wiring board, then the photonic device is mounted at the center in the connector, and if the optical transmission line is disposed on a edge side, i.e., outside the electrical transmission line group, then the photonic device is mounted at the corresponding lateral end in the connector. As in the latter case, if the photonic device is mounted in a lateral end portion in the connector, not being sandwiched between conductive terminals (contacts), the space inside the connector can be efficiently used.

Further, a connector according to the present invention features: a body including the guide hole of U-shape in cross section, the guide hole being adapted to receive the end portion of the photoelectric flexible wiring board; the plurality of contacts, arranged laterally on the ceiling of the guide hole of the body such that the contacts correspond to the respective electrical transmission lines on the surface of the photoelectric flexible wiring board; and the photonic device, disposed on the ceiling of the guide hole of the body so as to face the optical signal entrance-cum-exit in the surface of the photoelectric flexible wiring board. Each of the contacts includes a middle portion embedded in the body, a first end portion exposed from the ceiling of the guide hole, and a second end portion protruded from a rear surface of the body for connection with to the board.

The connector of the present invention enables the photonic device and driver therefor to be excluded from the photoelectric flexible wiring board because the photonic device that performs photoelectric conversion is mounted at the position corresponding to the optical transmission line in the photoelectric flexible wiring board. Consequently, the optical transmission line can have substantially the same length as the wiring board, avoiding a situation where the length of the optical transmission line that is useful in high-speed transmission and is highly flexible is sacrificed for the photonic device and driver.

It is important in using this connector that the optical transmission line in the photoelectric flexible wiring board connected to the connector is aligned with the photonic device mounted in the connector. For this reason, the connector is preferably a plug-type connector provided with a guide hole to receive an end portion of the photoelectric flexible wiring board in such a manner that the optical transmission line in the photoelectric flexible wiring board is aligned with the photonic device in the connector upon reception of the end portion.

The position to dispose the photonic device in the connector depends on the wiring pattern of the electrical and optical transmission lines in the photoelectric flexible wiring board. Particularly, if the optical transmission line is disposed in the middle of the wiring board, then the photonic device is mounted at the center in the connector, and if the optical transmission line is disposed on a edge side, i.e., outside the electrical transmission line group, then the photonic device is mounted at the corresponding lateral end in the connector. As in the latter case, if the photonic device is mounted in a lateral end portion in the connector, not being sandwiched between conductive terminals (contacts), the space inside the connector can be efficiently used.

Moreover, a photoelectric flexible wiring board according to the present invention features: a plate-like base having an end portion receivable in the guide hole of the connector; the plurality of electrical transmission lines, arranged laterally on a surface of the plate-like base so as to be contactable with the respective contacts, the electrical transmission lines having the entire length substantially equal to the entire length of the photoelectric flexible wiring board; the optical transmission line, provided within the plate-like base and having the entire length substantially equal to the entire length of the photoelectric flexible wiring board; the optical signal entrance-cum-exit, provided in a surface of the end portion of the plate-like base so as to face the photonic device; and the waveguide mirror, disposed in the end portion of the optical transmission line so as to face the optical signal entrance-cum-exit, for bending the optical waveguide at a right angle.

In the photoelectric flexible wiring board according to the present invention, the transmission line for optical signals extends from the first end to the second end of the wiring board. As a result, the entire length of the photoelectric flexible wiring board is therefore substantially equal to the length of the optical transmission line. In addition, high-speed digital signals are delivered from the first end to the second end of the wiring board through the optical signal transmission line. Consequently, the wiring board can avoid a situation where high-speed digital signals pass through the electrical transmission line on the wiring board.

An end portion of the plate-like base is specifically a portion to be inserted into the connector. As described above, the above wiring board structure can be achieved by mounting the photonic device and the driver in the connector.

The plate-like base may be provided on end portions thereof with pairs of fixing portions for retaining the plate-like base by engaging with respective pairs of projections provided in the guide holes of the contacts in pairs. The fixing portions prevents the photoelectric flexible wiring board from being accidentally detached from the connectors.

The entrance-cum-exits for optical signals may be configured to be open into surfaces at the ends of the wiring board, or may be constructed may be configured to be open into end faces at the ends of the wiring board.

EFFECTS OF THE INVENTION

Because the connector for the photoelectric flexible wiring board according to the present invention is mounted with the photonic device at a position corresponding to the optical transmission line in the photoelectric flexible wiring board, the photonic device and the driver therefor can be removed from the photoelectric flexible wiring board. With this structure, the length of the optical transmission line in the photoelectric flexible wiring board can be extended to a length substantially equal to the entire length of the wiring board, so that the photoelectric flexible wiring board can be reduced in size in securing a necessary length for the optical transmission line and can be easily applied to small devices. Also, the exclusion of the less flexible mounting portions from the photoelectric flexible wiring board increases the flexibility of the photoelectric flexible wiring board, and the manufacturing costs thereof can thus be reduced. Moreover, because photoelectric conversion need not be performed on the photoelectric flexible wiring board, the wiring board can maintain the optical transmission characteristics, providing an effective measure for EMC and against degradation of signals.

Furthermore, in the photoelectric flexible wiring board according to the present invention, the end portions thereof does not have mounting portions for the photonic devices and the drivers therefor, both the optical and electrical transmission lines extend up to the ends of the board, and the signal entrance-cum-exits for the both kinds of signals are provided at the ends of the respective transmission lines. Therefore, the wiring board is highly flexible, and the width of the board can be reduced. Because the wiring board does not handle conversion from optical signals to electrical signals, avoiding a situation where high-speed digital signals pass through the electrical transmission lines, the photoelectric flexible wiring board can maintain EMC characteristics and transmission characteristics for high-speed digital signals.

BEST MODE FOR CARRYING OUT THE INVENTION

Figure 1:
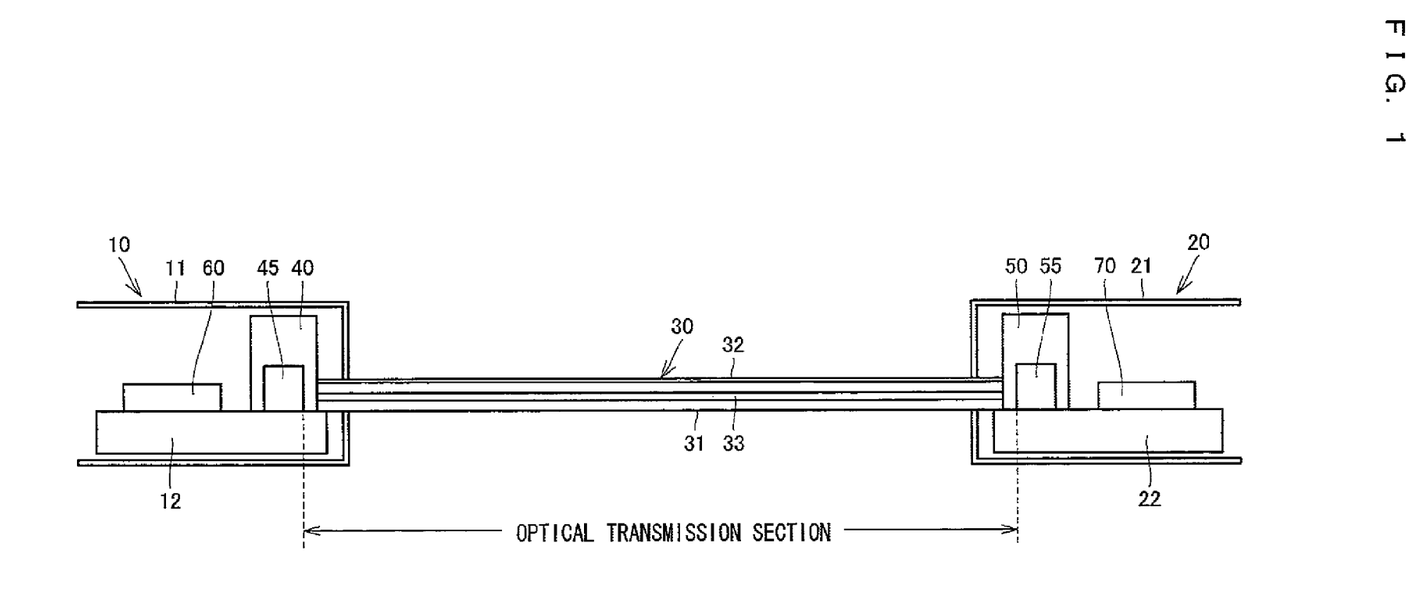
FIG. 1 is a schematic configuration view illustrating a wiring structure of an photoelectric flexible wiring board according to an embodiment of the present invention.
Figure 2:
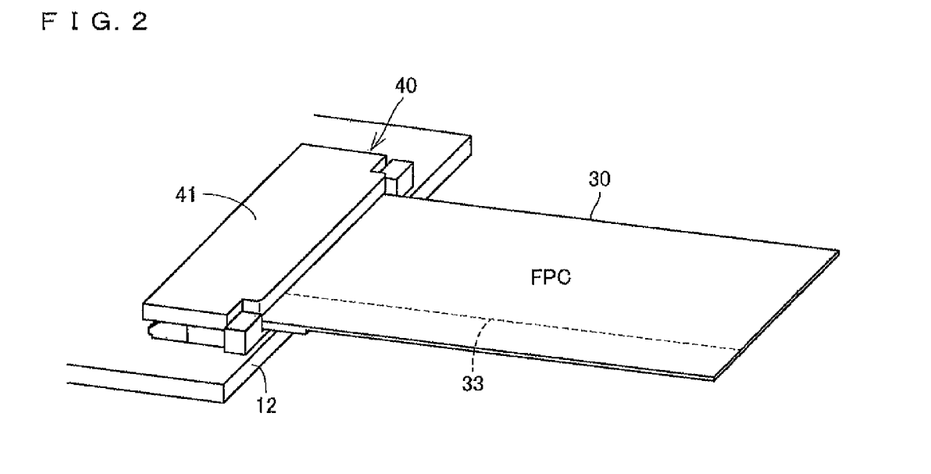
FIG. 2 is a perspective view of the photoelectric flexible wiring board and a connector in use in the wiring structure.
Figure 3:
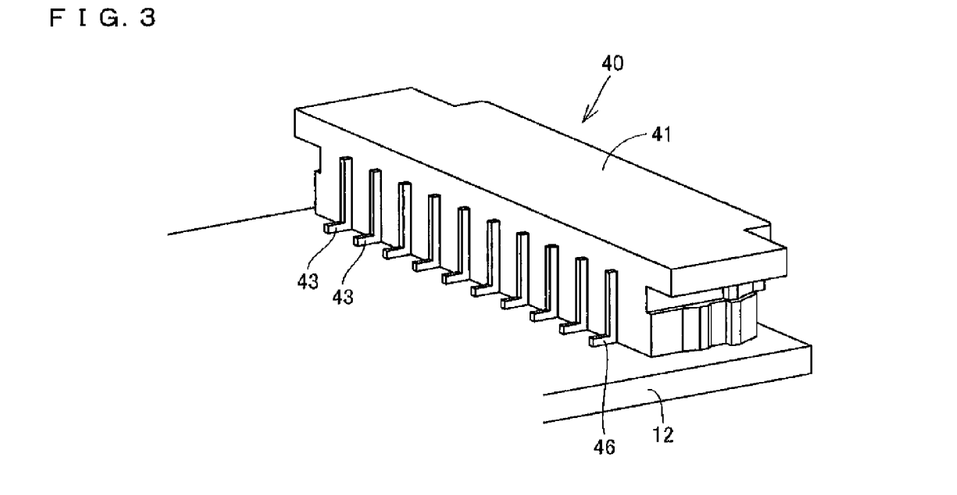
FIG. 3 is a perspective view of the connector in use as viewed from the rear side thereof.
Figure 4:
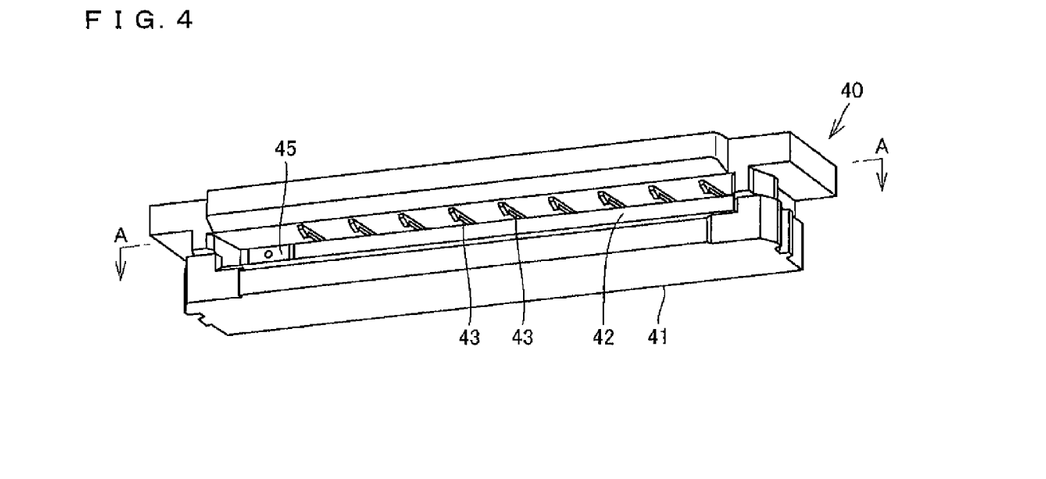
FIG. 4 is a perspective view of the connector as viewed from the front side thereof.
Figure 5:
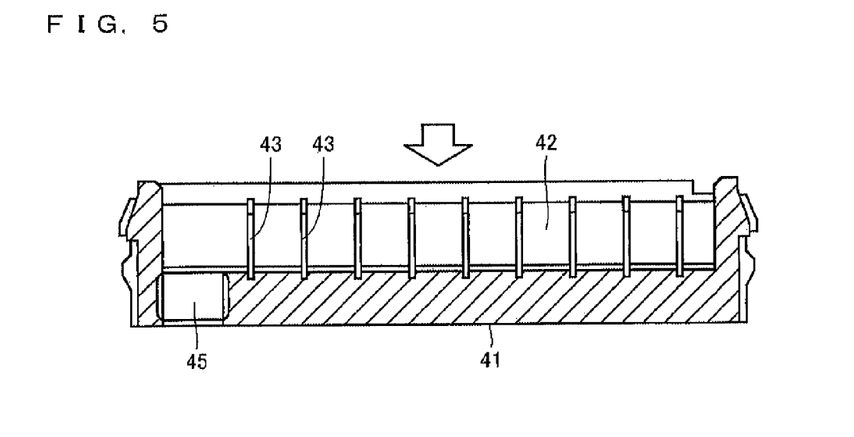
FIG. 5 is a transverse cross-sectional plan view of the connector viewed along arrows A-A in FIG. 4.

Embodiments of the present invention will be described in detail below with reference to the drawings. FIG. 1 is a schematic configuration view illustrating a wiring structure of an photoelectric flexible wiring board according to an embodiment of the present invention, FIG. 2 is a perspective view of the photoelectric flexible wiring board and a connector in use in the wiring structure, FIG. 3 is a perspective view of the connector in use as viewed from the rear side thereof, FIG. 4 is a perspective view of the connector as viewed from the front side thereof, and FIG. 5 is a transverse cross-sectional plan view of the connector, viewed along arrows A-A in FIG. 4.

As shown in FIG. 1, a wiring structure of an photoelectric flexible wiring board according to the present embodiment is used in information processing terminal apparatus with a rotating portion to connect an electric circuit in a main body 10 with an electric circuit in a cover body 20. With the main body 10 being rotatably coupled to the cover body 20 doubling as a display by means of a hinge shaft, such information processing terminal apparatuses include cellular phones, PDAs (personal digital assistants), personal computers, and game consoles.

The main body 10 contains a mounting board 12 in its housing 11, and the cover body 20 that is rotatably coupled to the main body 10 also contains a mounting board 22 in its housing 21, as in the main body 10. The mounting board 12 on the main body side and the mounting board 22 on the cover body side are both rigid boards, which are connected by means of an photoelectric flexible wiring board 30 so as not to hinder the rotational movement of the main body 10 and the cover body 20. For this connection, plug-type connectors 40 and 50 are mounted at opposed ends of the mounting boards 12 and 22.

The photoelectric flexible wiring board 30 includes a flexible plate-like base 31, a plurality of electrical transmission lines 32 printed in parallel with one another using copper or the like on a surface of the plate-like base 31, and an optical transmission line 33 embedded along the electrical transmission lines 32 in the plate-like base 31. The electrical transmission lines 32 are arranged at predetermined spacing in a lateral direction of the plate-like base 31, each extending across the entire length of the plate-like base 31.

A key feature of the photoelectric flexible wiring board 30 is the structure of the optical transmission line 33. The optical transmission line 33 is provided outside the rows of the electrical transmission lines 32 continuously and in parallel thereto over the entire length of the plate-like base 31. In this configuration, a photonic device that performs photoelectric conversion and a driver therefor are excluded from the photoelectric flexible wiring board 30. That is, the optical transmission line 33 is continuously provided from one end to the other end of the photoelectric flexible wiring board. Signal entrance-cum-exits at ends of the optical transmission line are exposed and opened into opposite end faces of the photoelectric flexible wiring board 30.

The connectors 40 and 50 are plug types having substantially the same structure, which structure will be described referring to FIGS. 2 to 5 with respect to one of the connectors 40. The connector 40 has a horizontally long, rectangular resin body 41 with a longer lateral width than the lateral width of the photoelectric flexible wiring board 30. The resin body 41 is provided in its front face with a horizontally long guide hole 42 to receive an end portion of the photoelectric flexible wiring board 30.

In the resin body 41, contacts 43 that are equal in number to the electrical transmission lines 32 on the photoelectric flexible wiring board 30 are provided through insert molding. The plurality of contacts 43 correspond to the plurality of electrical transmission lines 32 on the photoelectric flexible wiring board 30 and are provided in the resin body 41 at the same spacings as those of the electrical transmission lines 32.

An end portion of each contact 43 projects linearly frontward along the ceiling of the guide hole 42 so as to function as a contact terminal to pressingly contact each of the electrical transmission line 32 on the upper surface of the end portion of the photoelectric flexible wiring board 30 when its end portion is inserted in the guide hole 42. The other end portion of each contact 43 projects in an L-shape from the rear side of the resin body 41 to function as a contact terminal to be mounted and fixed on the mounting board 12 and to be connected with an electric circuit on the mounting board 12.

Inside the resin body 41, a photonic device 45 that performs photoelectric conversion is so provided as to correspond to the optical transmission line 33 in the photoelectric flexible wiring board 30. The photonic device 45 is located at a lateral end in the resin body 41, more specifically, outside the plurality of contacts 43, because the optical transmission line 33 is at a lateral edge of the photoelectric flexible wiring board (outside the rows of the electrical transmission lines). The photonic device 45 is disposed in the back of the guide hole 42 facing the front so that the photonic device 45 opposes a signal entrance-cum-exit in the end face of the optical transmission line 33 when the end portion of the photoelectric flexible wiring board 30 is received in the guide hole 42.

A connection terminal 46 of the photonic device 45 protrudes in an L-shape from the rear side of the resin body 41 so as to be mounted and fixed on the mounting board 12 and to be connected to the electric circuit on the mounting board 12, like connection terminals of the contacts 43.

A driver 60 to drive the photonic device 45 is provided in the connector 40 and is mounted on the mounting board 12 together with the connector 40.

The connector 50 in the cover body 20 is also mounted at an end of the mounting board 22 and contains a photonic device 55 corresponding to the optical transmission line 33 in the photoelectric flexible wiring board 30. A driver 70 to drive the photonic device 55 is mounted on the mounting board 22 together with the connector 50.

In the wiring structure of the photoelectric flexible wiring board according to the present embodiment, the mounting board 12 in the main body 10 of the electronic device and the mounting board 22 in the cover body 20 are connected electrically and optically through the connector 40, the photoelectric flexible wiring board 30, and the connector 50. That is, a first end portion of the photoelectric flexible wiring board 30 is plugged in the connector 40, while a second end portion is plugged in the connector 50, whereby the photoelectric flexible wiring board 30 connects between the mounting boards 12 and 22 photoelectrically.

More specifically, the first end portion of the photoelectric flexible wiring board 30 is inserted in the guide hole 42 in the connector 40, so that the respective connection terminals of the contacts 43 contact associated end portions (signal entrance-cum-exits) of the electrical transmission lines arranged on the photoelectric flexible wiring board 30. Then, the second end portion of the photoelectric flexible wiring board 30 is inserted in the guide hole in the connector 50, so that the respective connection terminals of the contacts contact associated end portions (signal entrance-cum-exits) of the electrical transmission lines 32 arranged on the photoelectric flexible wiring board 30. With this structure, electrical signals are transmitted to and fro between the mounting boards 12 and 22 through the contacts 43 in the connector 40, the electrical transmission lines 32 on the photoelectric flexible wiring board 30, and the contacts in the connector 50.

As for the transmission of optical signals, the first end portion of the photoelectric flexible wiring board 30 is inserted in the guide hole 42 in the connector 40, so that the associated end face (signal entrance-cum-exit) of the optical transmission line 33 in the photoelectric flexible wiring board 30 opposes the photonic device 45 inside the connector 40. Then, the second end portion of the photoelectric flexible wiring board 30 is inserted in the guide hole in the connector 50, so that the associated end face (signal entrance-cum-exit) of the optical transmission line 33 in the photoelectric flexible wiring board 30 opposes the photonic device 55 inside the connector 50. With this structure, the respective photonic devices 45 and 55 inside the connectors 40 and 50 are connected through the optical transmission line 33 in the photoelectric flexible wiring board 30. As a result, optical signals are transmitted in the following manner.

For example, the photonic device 45 inside the connector 40 converts electrical signals to optical signals, which are transmitted through the optical transmission line 33 in the photoelectric flexible wiring board 30 to the photonic device 55 inside the connector 50, where the optical signals are changed into electrical signals again. Alternatively, the photonic device 55 inside the connector 50 converts electrical signals to optical signals, which are transmitted through the optical transmission line 33 in the photoelectric flexible wiring board 30 to the photonic device 45 inside the connector 40, where the optical signals are changed into electrical signals again.

As described herein, the photonic devices 45 and 55 and the drivers 60 and 70 all associated with the optical transmission line 33 in the photoelectric flexible wiring board 30 are not on the photoelectric flexible wiring board 30 but mounted on the mounting boards 12 and 22. As such, a freely bendable optical transmission section is provided from end to end, i.e., over the entire length, of the photoelectric flexible wiring board 30. The overall flexibility is thus improved as compared with the case in which the photonic devices 45 and 55 etc. impede the free bend. That is, if the length of the photoelectric flexible wiring board 30 is unchanged, then the flexibility is improved, and if the flexibility is secured to the same degree, then the length of the photoelectric flexible wiring board 30 can be reduced.

Not mounting the photonic devices 45 and 55 and the drivers 60 and 70 on the photoelectric flexible wiring board 30 allows reduction in the cost of mounting on the photoelectric flexible wiring board 30, leading to enhanced economic efficiency of the photoelectric flexible wiring board 30.

Also, since photoelectric conversion is not performed on the photoelectric flexible wiring board 30, the wiring board can maintain the optical transmission characteristics, which is very advantageous in terms of measures for EMC and against signal degradation.

Figure 6:
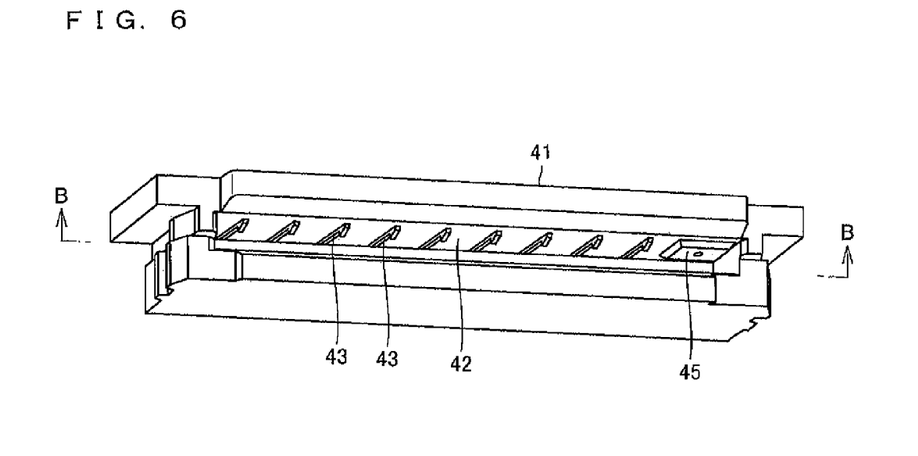
FIG. 6 is a perspective view of a connector according to another embodiment of the present invention.
Figure 7:
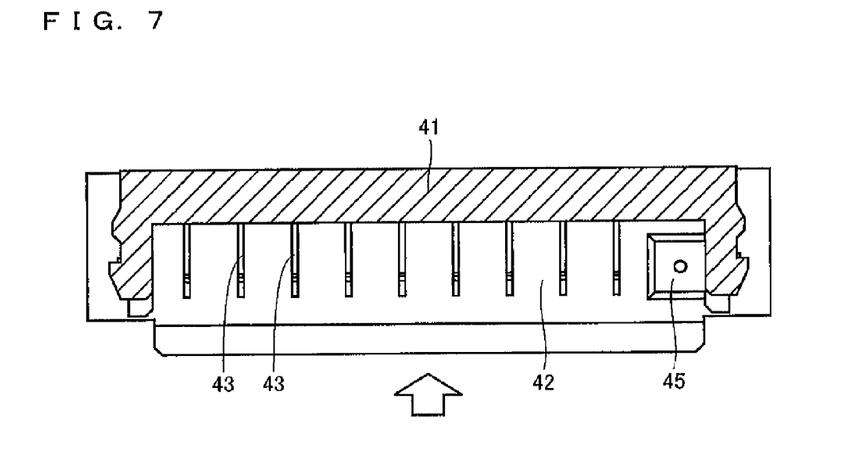
FIG. 7 is a transverse cross-sectional plan view of the connector viewed along arrows B-B in FIG. 6.

FIG. 6 is a perspective view of a connector according to another embodiment of the present invention, whereas FIG. 7 is a transverse cross-sectional plan view of the connector viewed along arrows B-B in FIG. 6.

The present embodiment is different from the embodiment illustrated in FIGS. 1 to 5 in the position of the photonic device 45 in the connector 40. That is, the photonic device 45 in the embodiment illustrated in FIGS. 1 to 5 is in the back surface of the guide hole 42, i.e., in an opposed position to an end face of the inserted photoelectric flexible wiring board 30, while the photonic device 45 in the present embodiment faces the upper surface of an end portion of an photoelectric flexible wiring board 30 received in the guide hole 42, such that the photonic device 45 is disposed perpendicularly relative to the optical transmission line 33 in the photoelectric flexible wiring board 30. For this positional relationship, waveguide mirrors to bend optical waveguide in the wiring board 30 at a right angle are provided at opposite ends of the optical transmission line 33 in the photoelectric flexible wiring board 30, and signal entrance-cum-exits are open in the surface of the wiring board 30.

The connection terminal 46 of the photonic device 45 protrudes in an L-shape from the rear side of a resin body 41 so as to be mounted and fixed on the mounting board 12 and to be connected to an electric circuit on the mounting board 12, like contact terminals of contacts 43.

Figure 8:
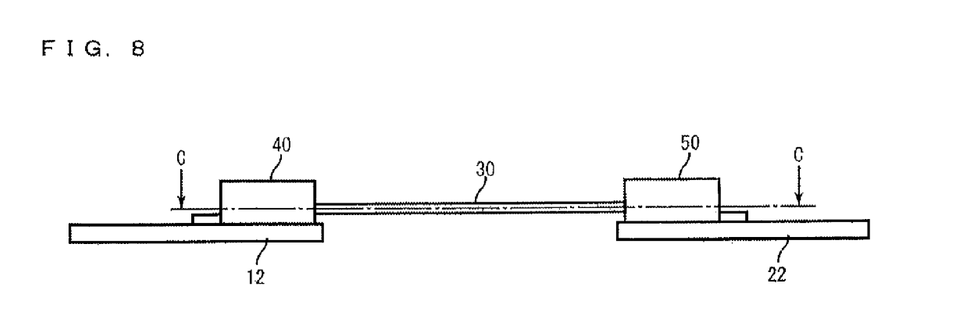
FIG. 8 is a schematic configuration view in the form of a side view of a wiring structure of an photoelectric flexible wiring board according to a still another embodiment of the present invention.
Figure 9:
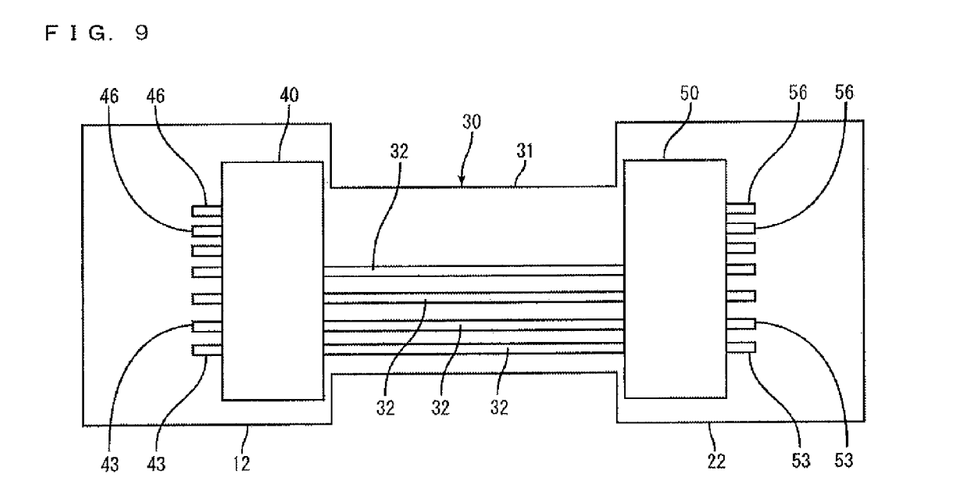
FIG. 9 is a plan view of the same wiring structure.
Figure 10:
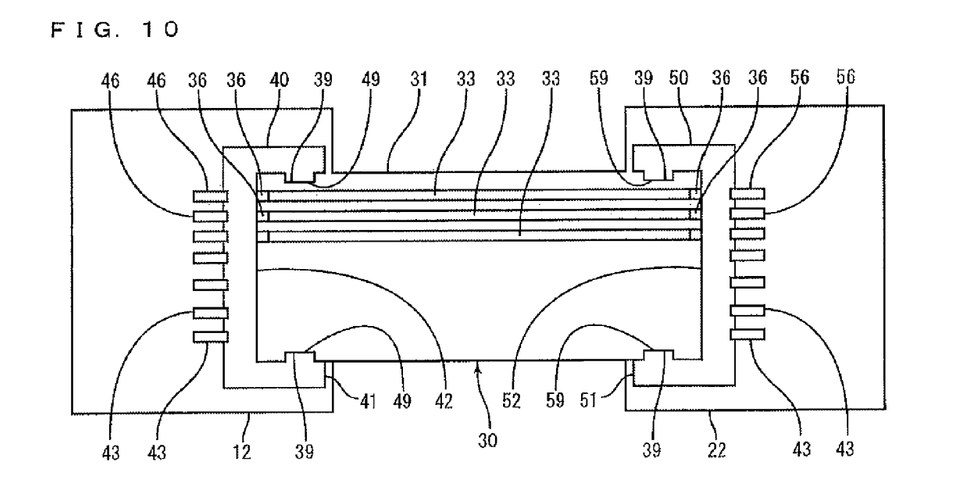
FIG. 10 is a transverse cross-sectional plan view of the wiring structure, taken along line C-C in FIG. 8.
Figure 11:
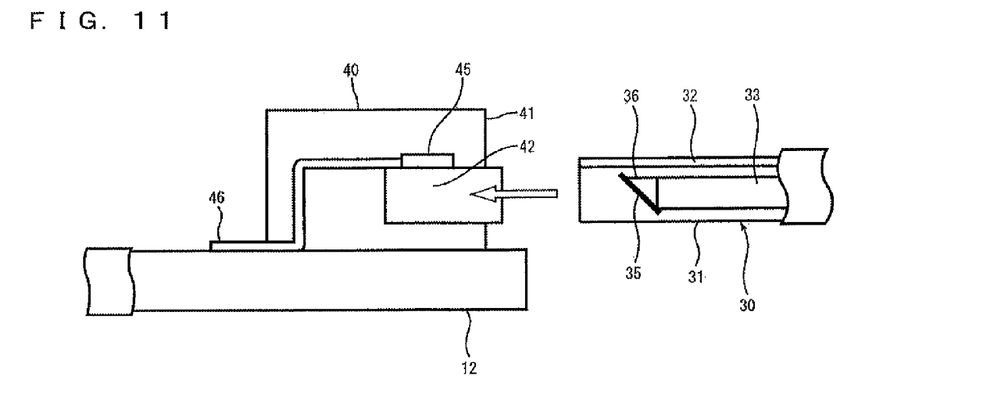
FIG. 11 is a longitudinal cross-sectional side view showing a relationship between the photoelectric flexible wiring board and a connector in the wiring structure.
Figure 12:
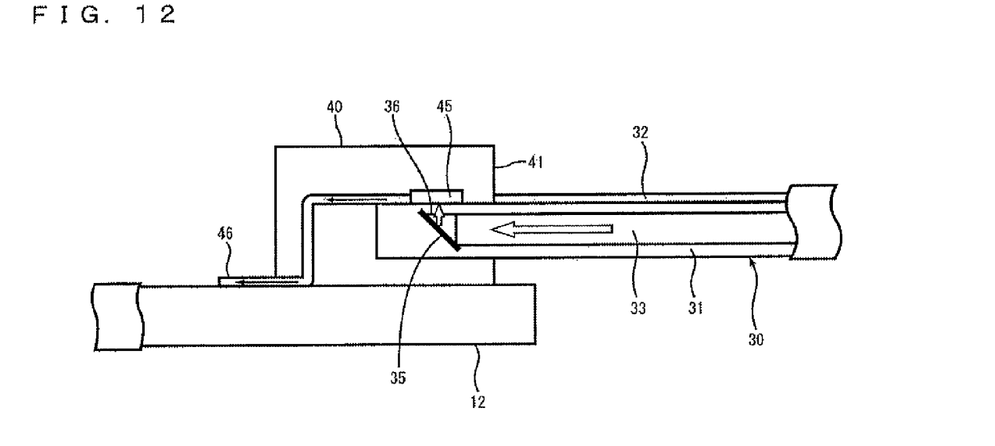
FIG. 12 is a longitudinal cross-sectional side view showing the relationship between the photoelectric flexible wiring board and the connector in the wiring structure.

FIG. 8 is a schematic configuration view in the form of a side view of a wiring structure of an photoelectric flexible wiring board according to a still another embodiment of the present invention, FIG. 9 is a plan view of the same wiring structure, FIG. 10 is a transverse cross-sectional plan view of the wiring structure, taken along line C-C in FIG. 8, and FIGS. 11 and 12 are longitudinal cross-sectional side views showing a positional relationship of the photoelectric flexible wiring board and a connector in the wiring structure.

In the present embodiment, as in the embodiment illustrated in FIGS. 6 and 7, the photonic device 45 in the connector 40 is disposed perpendicularly relative to the optical transmission line 33 in the photoelectric flexible wiring board 30. More specifically, the photonic device 45 is provided facing down on the ceiling of the guide hole 42 so as to oppose the upper surface of an end portion of the photoelectric flexible wiring board 30 received in the guide hole 42. The photonic device 45 has its lead portion embedded in the resin body 41 and its leading end portion protruding from the rear surface at a lower end portion of the resin body 41 to follow a mounting board 12, serving as a contact terminal 46 to be mounted and fixed on the mounting board 12 and to be connected to an electric circuit on the mounting board 12, like connection terminals of contacts 43. Note that a connector 50 has a similar structure to that of the connector 40.

The photoelectric flexible wiring board 30 includes a flexible plate-like base 31. A plurality of electrical transmission lines 32 are printed in parallel with one another across the entire length on a surface, more specifically, on a surface excluding an edge portion, of the plate-like base 31. A plurality of optical transmission lines 33 are embedded in parallel with one another in the edge portion of the plate-like base 31 from a first end to a second end. Waveguide mirrors 35 are provided at opposite ends of the optical transmission lines 33 so as to bend optical waveguides in the optical transmission lines 33 upward at a right angle, and signal entrance-cum-exits 36 are open in the upper surface of the plate-like base 31. With this structure, the signal entrance-cum-exits 36 of the optical transmission lines 33 oppose the photonic devices 45 and 55 when the end portions of the photoelectric flexible wiring board 30 are received in the guide hole 42 in the connector 40 and the guide hole in the connector 50, respectively.

Also, pairs of recessed fixing portions 39 are provided on opposite edges of either end portion of the photoelectric flexible wiring board 30. When the end portions of the photoelectric flexible wiring board 30 are inserted in the guide hole 42 in the connector 40 and the guide hole in the connector 50 respectively, the pairs of recessed fixing portions 39 come in engagement with pairs of projections 49 projecting into the guide hole 42 from both sides of the connector 40 and pairs of projections 59 projecting inward in the guide hole from both sides of the connector 50, through which engagement the inserted end portions of the photoelectric flexible wiring board 30 are retained.

Figure 13:
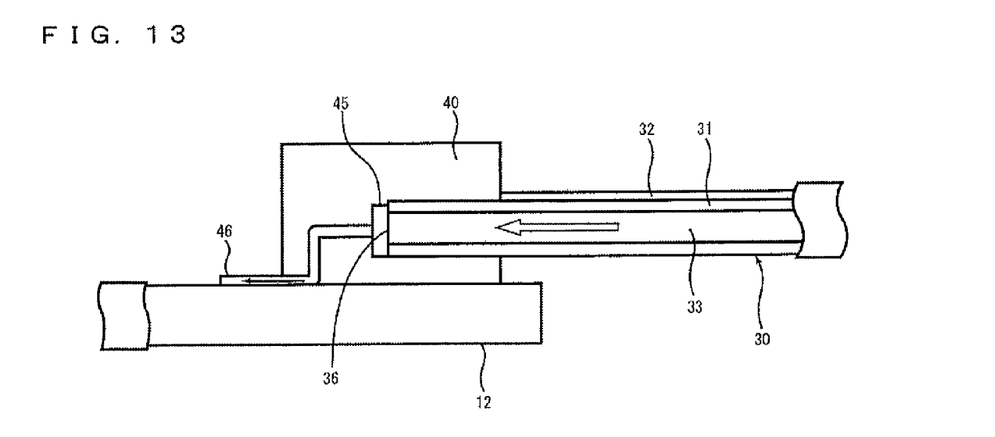
FIG. 13 is a longitudinal cross-sectional side view showing a main part of an photoelectric flexible wiring board, illustrating still another embodiment of the present invention.

FIG. 13 is a longitudinal cross-sectional side view showing a main part of an photoelectric flexible wiring board according to a still another embodiment of the present invention.

The present embodiment has a different photoelectric flexible wiring board 30 from that of the embodiment illustrated in FIGS. 8 to 12. In the photoelectric flexible wiring board 30 in the present embodiment, the optical transmission line 33 is laid over the entire length from a first end to a second end in the plate-like base 31. Signal entrance-cum-exits 36 provided at opposite ends of the optical transmission line 33 are open longitudinally into opposite end faces of the plate-like base 31, as in the embodiment illustrated in FIGS. 1 to 5. Also as in the embodiment illustrated in FIGS. 1 to 5, photonic devices 45 and 55 in connectors 40 and 50 are attached on the back surfaces of the guide holes of the connectors 40 and 50 so as to directly oppose the signal entrance-cum-exits 36 at the ends when the photoelectric flexible wiring board 30 have its end portions received in the guide holes. Other structures are the same as those in the embodiment illustrated in FIGS. 8 to 12.

Also in the present embodiment, the optical transmission line 33 is provided across the entire length of the photoelectric flexible wiring board 30. That is, the optical transmission line 33 is laid between the opposite end portions of the photoelectric flexible wiring board 30 to be inserted in the connectors 40 and 50, and the photonic devices 45 and 55 and the drivers 60 and 70 are excluded from the photoelectric flexible wiring board 30. Therefore, the cost of mounting on the photoelectric flexible wiring board 30 can be reduced, improving economic efficiency of the photoelectric flexible wiring board 30. Moreover, since photoelectric conversion is not performed on the photoelectric flexible wiring board 30, the wiring board can maintain the optical transmission characteristics, which is very advantageous in terms of measures for EMC and against signal degradation.

As can be seen from these embodiments, the orientation of the photonic devices 45 and 55 in the connectors 40 and 50 is not particularly limited—the photonic devices may be oriented to fully face the respective end faces of the optical transmission line 33 in the photoelectric flexible wiring board 30 or may be disposed to face the orthogonal direction of the optical transmission line 33. The orientation of the photonic devices accordingly determines the orientations of the end portions (the signal entrance-cum-exits) of the optical transmission line 33 of the photoelectric flexible wiring board 30 such that the end portions face the photonic devices 45 and 55.

Further, in the foregoing embodiments, the optical transmission line or lines 33 in the photoelectric flexible wiring board 30 are disposed outside the rows of the electrical transmission lines 32 and along a side edge of the wiring board, and the photonic device or devices 45 is accordingly provided at a lateral end in the connector 40. However, this position may be modified—the optical transmission line or lines 33 may be disposed on both sides of the electrical transmission lines 32 or may be disposed between the transmission lines 32. In the case where the optical transmission line or lines 33 are disposed outside the rows of the electrical transmission lines 32, and the photonic device or devices 45 are accordingly provided at a lateral end or lateral ends of the connector 40, space for disposing the driver or drivers 60 can be easily secured on the mounting board 12, as previously described.

In one of the foregoing embodiments, the photoelectric flexible wiring board 30 received in the connectors 40 and 50 are fixed through projection-recess engagement. However, it is possible to use such a structure as to further insert sliders linearly after the insertion of the photoelectric flexible wiring board 30 into the guide holes in the connectors 40 and 50.

Other than this structure, is it also possible to use such a fixing structure as to pivotingly insert sliders into the guide holes in the connectors 40 and 50, and various other fixing structures may be used. The more security in fixing the inserted photoelectric flexible wiring board 30 increases accuracy and facility of alignment between the photonic devices 45 and 55 and the optical transmission line(s) 33.

DESCRIPTION OF REFERENCE NUMERALS

10 main body of electronic device
20 cover body of electronic device
11, 21 housing
12, 22 mounting board (rigid board)
30 photoelectric flexible wiring board
31 plate-like base
32 electrical transmission line
33 optical transmission line
36 signal entrance-cum-exit
40, 50 connector
41 body
42 guide hole contact
45, 55 photonic device
60, 70 driver

The invention claimed is:

1. A connection structure of a photoelectric flexible wiring board for connecting the photoelectric flexible wiring board to a board using a connector, the photoelectric flexible wiring board transmitting both optical and electrical signals, wherein the connector comprises:
a guide hole of U-shape in cross section having a ceiling, a back surface and a surface opposing the ceiling, adapted to receive an end portion of the photoelectric flexible wiring board, with an end of the photoelectric flexible wiring board facing the back surface,
a plurality of contacts arranged laterally on the ceiling of the guide hole, and
a photonic device provided on the ceiling of the guide hole;
the board is mounted with the connector and a driver for the photonic device, the driver being adapted to perform photoelectric conversion; and
the photoelectric flexible wiring board comprises:
a plurality of electrical transmission lines, arranged laterally on a top surface thereof so as to be contactable directly with the respective contacts on the ceiling of the guide hole, the electrical transmission lines having an entire length substantially equal to an entire length of the photoelectric flexible wiring board,
an optical transmission line, provided within the photoeletric flexible wiring board
and having an
entire length substantially equal to the entire length of the photoelectric flexible wiring board,
an optical signal entrance-cum-exit, provided in a surface of an end portion of the optical transmission line so as to face the photonic device, and
a waveguide mirror, disposed in an end portion of the optical transmission line so as to face the optical signal entrance-cum-exit, for bending the optical waveguide at a right angle.

2. The connection structure of the photoelectric flexible wiring board according to claim 1, wherein the photonic device is disposed at an outermost position in a direction in which the contacts are arranged, and
the optical transmission line is disposed at an outermost position in a direction in which the electrical transmission lines are arranged.

3. A connection structure of a photoelectric flexible wiring board for connecting the photoelectric flexible wiring board to a board using a connector, the photoelectric flexible wiring board transmitting both optical and electrical signals, wherein the connector comprises:
a guide hole of U-shape in cross section, adapted to receive an end portion of the photoelectric flexible wiring board,
a plurality of contacts arranged laterally on a ceiling of the guide hole, and
a photonic device provided on the ceiling of the guide hole;
the board is mounted with the connector and a driver for the photonic device, the driver being adapted to perform photoelectric conversion; and
the photoelectric flexible wiring board comprises:
a plurality of electrical transmission lines, arranged laterally on a surface thereof so as to be contactable with the respective contacts, the electrical transmission lines having an entire length substantially equal to an entire length of the photoelectric flexible wiring board,
an optical transmission line, provided within the photoelectric flexible wiring board and having an entire length substantially equal to the entire length of the photoelectric flexible wiring board,
an optical signal entrance-cum-exit, provided in a surface of the end portion so as to face the photonic device, and a waveguide mirror, disposed in an end portion of the optical transmission line so as to face the optical signal entrance-cum-exit, for bending the optical waveguide at a right angle, wherein the connector further comprises a pair of projections respectively provided at longitudinal opposite ends of the guide hole, and the photoelectric flexible wiring board further comprises a pair of fixing portions respectively provided at opposite edges of the end portion thereof, the fixing portions being recessed for engagement with the projections.

4. The connection structure of the photoelectric flexible wiring board according to claim 1, wherein the connector further comprises a slider for fixing the photoelectric flexible wiring board with the end portion thereof received in the guide hole.

5. A connection structure of a photoelectric flexible wiring board for connecting the photoelectric flexible wiring board to a board using a connector, the photoelectric flexible wiring board transmitting both optical and electrical signals, wherein the connector comprises:

a guide hole of U-shape in cross section, adapted to receive an end portion of the photoelectric flexible wiring board, a plurality of contacts arranged laterally on a ceiling of the guide hole, and a photonic device provided on the ceiling of the guide hole;

the board is mounted with the connector and a driver for the photonic device, the driver being adapted to perform photoelectric conversion; and the photoelectric flexible wiring board comprises:

a plurality of electrical transmission lines, arranged laterally on a surface thereof so as to be contactable with the respective contacts, the electrical transmission lines having an entire length substantially equal to an entire length of the photoelectric flexible wiring board, an optical transmission line, provided within the photoelectric flexible wiring board and having an entire length substantially equal to the entire length of the photoelectric flexible wiring board, an optical signal entrance-cum-exit, provided in a surface of the end portion so as to face the photonic device, and a waveguide mirror, disposed in an end portion of the optical transmission line so as to face the optical signal entrance-cum-exit, for bending the optical waveguide at a right angle, wherein the connection structure is applied to an information processing terminal apparatus including a main body, a cover body doubling as a display, and a hinge shaft pivotally coupling the main body to the cover body, the main body includes a main-body-side mounting board serving as said board and a main- body-side connector serving as said connector, the cover body includes a cover-body-side mounting board serving as said board and a cover- body-side connector serving as said connector, and the photoelectric flexible wiring board includes a first end portion receivable in a guide hole of the main-body-side connector and a second end portion receivable in a guide hole of the cover- body-side connector.

6. A connector for use in a connection structure of a photoelectric flexible wiring board for connecting the photoelectric flexible wiring board to a board using the connector, the photoelectric flexible wiring board transmitting both optical and electrical signals, wherein the connector comprises:

a body including a guide hole of U-shape in cross section, the guide hole being adapted to receive an end portion of the photoelectric flexible wiring board;

a plurality of contacts, arranged laterally on the ceiling of the guide hole of the body such that the contacts correspond to respective electrical transmission lines on a surface of the photoelectric flexible wiring board; and a photonic device, disposed on the ceiling of the guide hole of the body so as to face an optical signal entrance-cum-exit in the surface of the photoelectric flexible wiring board, wherein each of the contacts includes:

a middle portion embedded in the body, a first end portion exposed from the ceiling of the guide hole, and a second end portion protruded from a rear surface of the body for connection to the board;

the board is mounted with the connector and a driver for the photonic device, the driver being adapted to perform photoelectric conversion; and the photoelectric flexible wiring board comprises:

the plurality of electrical transmission lines, arranged laterally on a surface thereof so as to be contactable with the respective contacts, the electrical transmission lines having an entire length substantially equal to an entire length of the photoelectric flexible wiring board;

an optical transmission line, provided within the photoelectric flexible wiring board and having an entire length substantially equal to the entire length of the photoelectric flexible wiring board;

the optical signal entrance-cum-exit, provided in a surface of the end portion so as to face the photonic device; and a waveguide mirror, disposed in an end portion of the optical transmission line so as to face the optical signal entrance-cum-exit, for bending the optical waveguide at a right angle.

7. The connector according to claim 6, wherein the photonic device is disposed at an outermost position in a direction in which the contacts are arranged.

8. A photoelectric flexible wiring board for use in the connection structure of the photoelectric flexible wiring board according to claim 1, the photoelectric flexible wiring board comprising:

a plate-like base having the end portion receivable in the guide hole of the connector;

the plurality of electrical transmission lines, arranged laterally on a surface of the plate-like base so as to be contactable with the respective contacts, the electrical transmission lines having the entire length substantially equal to the entire length of the photoelectric flexible wiring board;

the optical transmission line, provided within the plate-like base and having the entire length substantially equal to the entire length of the photoelectric flexible wiring board;

the optical signal entrance-cum-exit, provided in a surface of the end portion of the plate-like base so as to face the photonic device; and the waveguide mirror, disposed in the end portion of the optical transmission line so as to face the optical signal entrance-cum-exit, for bending the optical waveguide at a right angle.

9. The photoelectric flexible wiring board according to claim 8, wherein the optical transmission line is disposed at an outermost position in a direction in which the electrical transmission lines are arranged.

10. A photoelectric flexible wiring board for use in a connection structure for connecting the photoelectric flexible wiring board to a board using a connector, the photoelectric flexible wiring board transmitting both optical and electrical signals, wherein the connector comprises:
a guide hole of U-shape in cross section, adapted to receive an end portion of the photoelectric flexible wiring board,
a plurality of contacts arranged laterally on a ceiling of the guide hole, and
a photonic device provided on the ceiling of the guide hole;
the board is mounted with the connector and a driver for the photonic device, the driver being adapted to perform photoelectric conversion; and
the photoelectric flexible wiring board comprises:
a plate-like base having the end portion receivable in the guide hole of the connector;
a plurality of electrical transmission lines, arranged laterally on a surface thereof so as to be contactable with the respective contacts, the electrical transmission lines having an entire length substantially equal to an entire length of the photoelectric flexible wiring board,
an optical transmission line, provided within the photoelectric flexible wiring board and having an entire length substantially equal to the entire length of the photoelectric flexible wiring board,
an optical signal entrance-cum-exit, provided in a surface of the end portion so as to face the photonic device,
a waveguide mirror, disposed in an end portion of the optical transmission line so as to face the optical signal entrance-cum-exit, for bending the optical waveguide at a right angle, wherein
the optical transmission line is disposed at an outermost position in a direction in which the electrical transmission lines are arranged; and
the plate-like base is provided on end portions thereof with pairs of fixing portions for retaining the plate-like base by engaging with respective pairs of projections provided in the guide holes of the connectors in pair.

* * * * *